United States Patent
Cho et al.

(10) Patent No.: US 7,751,939 B2
(45) Date of Patent: Jul. 6, 2010

(54) METHOD AND APPARATUS TO CORRECT STATIC DEFLECTION IN A HANDLING ROBOT

(75) Inventors: Phil Joo Cho, Suwon-si (KR); Jae Chul Hwang, Seoul (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 1390 days.

(21) Appl. No.: 11/181,728

(22) Filed: Jul. 15, 2005

(65) Prior Publication Data

US 2006/0161299 A1 Jul. 20, 2006

(30) Foreign Application Priority Data

Jan. 17, 2005 (KR) .................. 10-2005-0004327

(51) Int. Cl.
*G05B 19/19* (2006.01)
*G05B 13/00* (2006.01)

(52) U.S. Cl. .................. 700/254; 700/213; 700/262; 901/15; 901/48; 318/568.11; 318/568.16; 318/568.22; 414/225

(58) Field of Classification Search .......... 901/14; 188/196 V
See application file for complete search history.

(56) References Cited

U.S. PATENT DOCUMENTS 4,652,202 A * 3/1987 Kersten ............... 414/648
5,737,218 A * 4/1998 Demotte et al. ........... 700/86
6,037,733 A * 3/2000 Genov et al. .......... 318/568.11
6,085,125 A * 7/2000 Genov .................. 700/218
6,489,741 B1 * 12/2002 Genov et al. ............ 318/561
6,509,576 B2 1/2003 Woo-Dong
6,863,323 B2 * 3/2005 Neveu .................... 294/65
6,941,189 B2 * 9/2005 Linn et al. ............... 700/193
7,073,834 B2 * 7/2006 Matsumoto et al. ........ 294/1.1
2006/0216137 A1 * 9/2006 Sakata et al. .......... 414/222.13

FOREIGN PATENT DOCUMENTS

| JP | 04-33006 | 2/1992 |
| JP | 06-43918 | 2/1994 |
| JP | 11-188681 | 7/1999 |
| JP | 2000-183128 | 6/2000 |
| JP | 2005-1013 | 1/2005 |
| KR | 100160705 B1 | 8/1998 |
| KR | 2000-21210 A | 4/2000 |
| WO | 01/10608 | 2/2001 |

* cited by examiner

*Primary Examiner*—Thomas G Black
*Assistant Examiner*—Lin B Olsen
(74) *Attorney, Agent, or Firm*—Stanzione & Kim LLP

(57) ABSTRACT

An apparatus and method of optimally correcting a static deflection caused by a weight of an end effector coupled to a robot arm or a load on the end effector when the end effector is activated to handle a large sheet of glass. A deflection angle of the end effector is corrected by inserting a compensation member into a joint of the robot arm, and the static deflection caused by the weight of the handling robot when conveying the sheet of glass is also corrected in real time.

15 Claims, 10 Drawing Sheets

(z, θ) = (0mm, 0°)

(z, θ) = (626mm, 90°)

METHOD AND APPARATUS TO CORRECT STATIC DEFLECTION IN A HANDLING ROBOT

CROSS-REFERENCE TO RELATED APPLICATIONS

This application claims the benefit of Korean Patent Application No. 2005-4327, filed on Jan. 17, 2005 in the Korean Intellectual Property Office, the disclosure of which is incorporated herein by reference.

BACKGROUND OF THE INVENTION

1. Field of the Invention

The present general inventive concept relates to a method and apparatus to correct static deflection in a handling robot, and more particularly, to a method and apparatus to optimally correct static deflection caused by a weight of an end effector or a load on the end effector when the end effector is activated to handle large sheets of glass.

2. Description of the Related Art

Robots have been used for various purposes in various industrial fields. For example, the robots have been used to handle a sheet of glass in FDP fields such as LCD and PDP fields. The sheet of glass is loaded on a cassette called a glass buffer and is then delivered to each process area in a production line. A handling robot is used to remove the sheet of glass from the glass buffer in a unit process of the production line and then to load the sheet of glass back to the glass buffer after the sheet of glass is subjected to processing of the unit process.

Along with increased demands on flat display panels (FDPs), such as liquid crystal display panels (LCDs) and plasma display panels (PDPs), a size of a mother glass, which is a basic unit of FDP production, is increased to improve the productivity. Accordingly, a size of a handling robot for handling such glass is also increased since the productivity highly depends on the performance of the handling robot.

When the handling robot extends its end effector (or its hand) to handle a large sheet of glass, a weight of the end effector or a load on the end effector causes a large static deflection due to characteristics of the handling robot. If the static deflection is not minimized, a space for loading the glass may be increased, or the glass may be detached during handling, or the glass cannot be loaded on equipment under some circumstances, so that the glass cannot be used in the production line.

To overcome these problems, Korean Patent Publication No. 10-2000-21210 discloses a method for correcting static deflection in a robot.

In this correction method, a laser sensor attached to an end of the robot for object position correction is used to detect reference points of a current process object and a reference process object to set a corresponding object coordinate system, and a movement path of the robot is automatically corrected based on changes in a difference between the two coordinates.

Other methods have been used for correcting static deflection of large-size robots other than the glass handling robot. FIG. 1 illustrates a conventional static deflection correction method. Referring to FIG. 1, a position of an end effector 3 of a robot is measured in real time using a laser measurement apparatus 1 provided outside the robot, so that the position of the end effector 3 is controlled to correct static deflection of the end effector 3. A motor, such as a tilting mechanism 7, is provided on a reference point of a robot arm 5 to correct static deflection of the end effector 3.

However, in the conventional static deflection correction methods, the laser measurement apparatus 1 including a laser or the like cannot be installed in work areas of the robot due to characteristics of glass handling robots. Even if the static deflection of the end effector 3 is corrected using the laser measurement apparatus 1, a deflection angle of the end effector 3 cannot be corrected since general glass handling robots have no tilting mechanism 7 as shown in FIG. 1.

Even if the tilting mechanism 7 is installed in the glass handling robot, the angle of deflection of the end effector 3 in a specific direction (specifically, in an x direction) cannot be corrected. Also, the installation of the tilting mechanism 7 entails additional costs such as costs of the motor, and the laser measurement apparatus 1 and an apparatus provided for controlling the laser measurement apparatus 1 in real time also entail high additional costs.

SUMMARY OF THE INVENTION

In order to overcome the foregoing and/or other problems, it is an aspect of the present general inventive concept to provide a method and apparatus to correct static deflection in a handling robot including a robot arm and an end effector coupled thereto, which performs simple mechanical correction to minimize the static deflection of the end effector in such a manner that a shim plate is inserted into each joint between elements of the robot arm and the end effector so that the elements of the robot arm and the end effector are directed upward with respect to a horizontal plane.

It is another aspect of the present general inventive concept to provide a method and apparatus to current static deflection in a handling robot, in which a real-time compensation control of a vertical static deflection of an end effector is performed to optimally correct the static deflection of the handling robot.

Additional aspects and/or advantages of the invention will be set forth in part in the description which follows and, in part, will be obvious from the description, or may be learned by practice of the present inventive concept.

The foregoing and/or other aspects and advantages of the present inventive concept may be achieved by providing a method of correcting static deflection in a handling robot having a robot arm to handle glass, the method comprising correcting a deflection angle of an end effector coupled to the robot arm by inserting a compensation member into a joint of the robot arm.

The compensation member may allow each element of the robot arm and the end effector to be directed upward with respect to a horizontal plane to correct x and y-directional deflection angles.

The deflection angle may be corrected by calculating positions on the end effector for a plurality of positions of the robot arm using an end effector deflection model for a shim plate-based correction and using the following equation:

$$P_{hi} = f(\theta_z, \theta_d, \theta_l)$$

where $\theta_z = [\theta_z^1 \; \theta_z^2 \; \theta_z^3]$ (joint angle)

$\theta_d = [\theta_d^{02} \; \theta_d^{03} \; \theta_d^{12} \; \theta_d^{13} \; \theta_d^{22} \; \theta_d^{23} \; \theta_d^{32} \; \theta_d^{33}]$ (static deflection)

$\theta_l = [\theta_l^1 \; \theta_l^2 \; \theta_l^3]$ (shim)

where "$P_{hi}$ (i=1-3)" denotes the positions on the end effector.

The compensation member may include a shim plate, and a thickness and an insertion position of the shim plate, which minimize a calculation value of the equation, is determined to correct the deflection angle of the end effector.

The static deflection caused by a weight of the end effector when conveying the glass may be corrected in real time.

The real-time static deflection correction may be performed to correct a vertical static deflection using deflection compensation curves according to a vertical position (z), a longitudinal position (x), and a rotational position (θ) of the end effector.

The real-time static deflection correction may be performed to correct the vertical static deflection using a function differentiable for the vertical position (z), the longitudinal position (x), and the rotational position (θ) of the end effector, the function being expressed as follows:

$$dz(z, x, \theta) = \left(\frac{x}{x_m}\right)^2 (p(\theta)z^2 + q(\theta)z + r(\theta))$$

where $p(\theta) = (2f_1(\theta) - 4f_2(\theta) + 2f_3(\theta))/z_m^2$ $q(\theta) = (-3f_1(\theta) + 4f_2(\theta) - f_3(\theta))/z_m$ $r(\theta) = f_1(\theta)$ $f_i(\theta) = a_{1i}\theta^6 + a_{2i}\theta^5 + a_{3i}\theta^4 + a_{4i}\theta^3 + a_{5i}\theta^2 + a_{6i}\theta + a_{7i}$ ($i = 1, 2, 3, 4$)

$a_{1i} = 4(-7\delta_{i1} + 8\delta_{i2} - 9\delta_{i3} + 8\delta_{i4})/9\pi^6$ $a_{2i} = 16(\delta_{i3} - \delta_{i1})/9\pi^5$ $a_{3i} = (47\delta_{i4} - 64\delta_{i3} + 81\delta_{i2} - 64\delta_{i1})/9\pi^4$ $a_{4i} = 32(\delta_{i1} - \delta_{i3})/9\pi^3$ $a_{5i} = 2(-5\delta_{i4} + 16\delta_{i3} - 27\delta_{i2} + 16\delta_{i1})/9\pi^2$ $a_{6i} = 16(\delta_{i3} - \delta_{i1})/9\pi$ $a_{7i} = \delta_{i2}$ The foregoing and/or other aspects and advantages of the present general inventive concept may also be achieved by providing a method of correcting a static deflection in a handling robot, the method comprising correcting, in real time, the static deflection caused by a weight of the handling robot when conveying glass.

The foregoing and/or other aspects and advantages of the present general inventive concept may also be achieved by providing an apparatus to correct a static deflection in a handling robot, the apparatus comprising a robot arm to handle glass, an end effector coupled to the robot arm to hold the glass, and a compensation member inserted in a joint of the robot arm to correct a deflection angle of the end effector.

The compensation member may be a shim plate inserted in the joint between elements of the robot arm or between the robot arm and the end effector.

The apparatus may further comprise a controller to correct, in real time, the static deflection caused by a weight of the end effector when conveying the glass.

The foregoing and/or other aspects and advantages of the present general inventive concept may also be achieved by providing an apparatus to correct a static deflection in a handling robot, the apparatus comprising a robot arm to handle glass, an end effector coupled to the robot arm to hold the glass, and a controller to correct, in real time, the static deflection caused by a weight of the end effector when conveying the glass.

The controller may perform the real-time static deflection correction to correct a vertical static deflection using deflection compensation curves according to three variables corresponding respectively to a vertical position (z), a longitudinal position (x), and a rotational position (θ), or using a function differentiable for the three variables.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
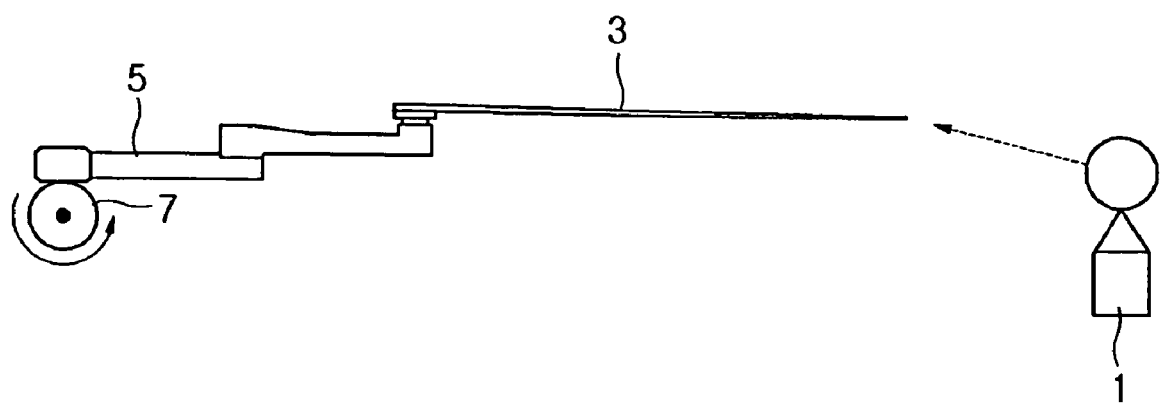
FIG. 1 is a sectional view of a robot for illustrating a conventional robot static deflection correction method.

Reference will now be made in detail to the embodiments of the present general inventive concept, examples of which are illustrated in the accompanying drawings, wherein like reference numerals refer to the like elements throughout. The embodiments are described below to explain the present invention by referring to the figures.

Figure 2:
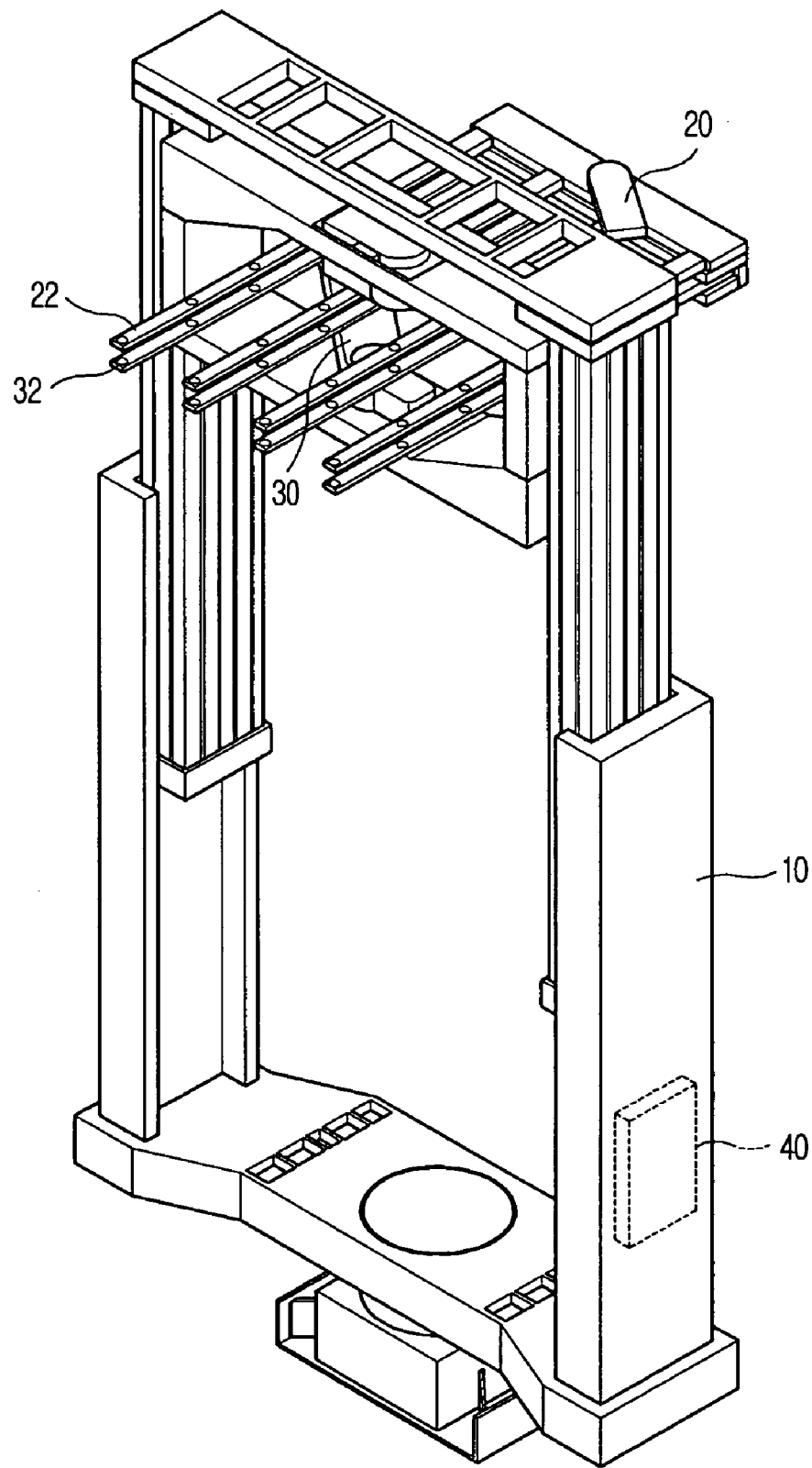
FIG. 2 is a perspective view illustrating a handling robot handle large sheets of glass according to an embodiment of the present general inventive concept.

FIG. 2 is a perspective view illustrating a robot to handle an article according to an embodiment of the present general inventive concept. The article may be large sheets of glass.

As shown in FIG. 2, the handling robot comprises a frame 10 having a vertical shaft and a rotating shaft, and two robot arms 20 and 30 rotatably connected to the frame 10 to handle two groups of sheets of glass, which are provided above the frame 10. The handling robot may further comprise a traveling shaft if needed.

Two end effectors (or hands) 22 and 32 are coupled respectively to front ends of the two robot arms 20 and 30 to handle the large sheets of glass.

The two robot arms 20 and 30 are disposed above and below with respect to each other so that they can simultaneously handle the two groups of sheets of glass during one operating cycle. Each of the robot arms 20 and 30 includes therein a motor (not shown) to generate a motion power to vertically or horizontally rotate the robot arm 20 or 30, and an encoder (not shown) to detect a position of the vertical or rotating shaft of the robot arm 20 or 30 according to an operation of the motor.

A controller 40 is connected to the two robot arms 20 and 30 to control an overall operation of a system of the handling robot and to perform a vertical movement and a rotation control of the two robot arms 20 and 30 according to the purpose of glass handling. Specifically, the controller 40 controls the operation of the motor based on a signal received from the encoder and also performs a real-time correction control of a vertical static deflection of the end effectors 22 and 32 to minimize a static deflection.

Figure 3:
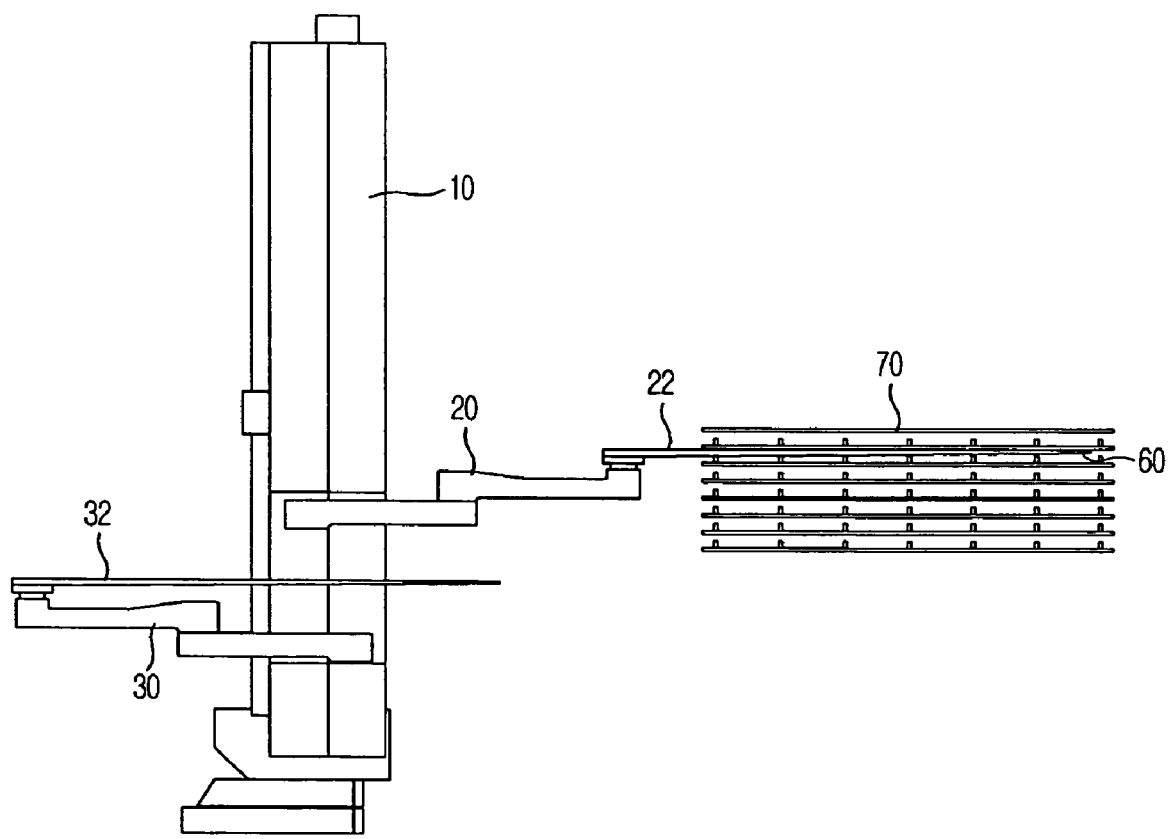
FIG. 3 is a side view illustrating a glass loading operation of the handling robot of FIG. 2.

FIG. 3 is a side view illustrating a glass loading operation of the handling robot of FIG. 2. Referring to FIG. 3, the handling robot uses the end effectors 22 and 32 connected to the corresponding front ends of the two robot arms 20 and 30 to vacuum-hold and load a large sheet of glass 60 (see FIGS. 3 and 8) in a glass buffer 70.

A weight and an extension distance of the end effector 22 or 32 vary depending on a size of a sheet of glass to be handled. If the large sheet of glass 60 is handled, the weight of the end effectors 22 and 32 is about 100 kg and the extension distance thereof is several meters.

Figure 4:
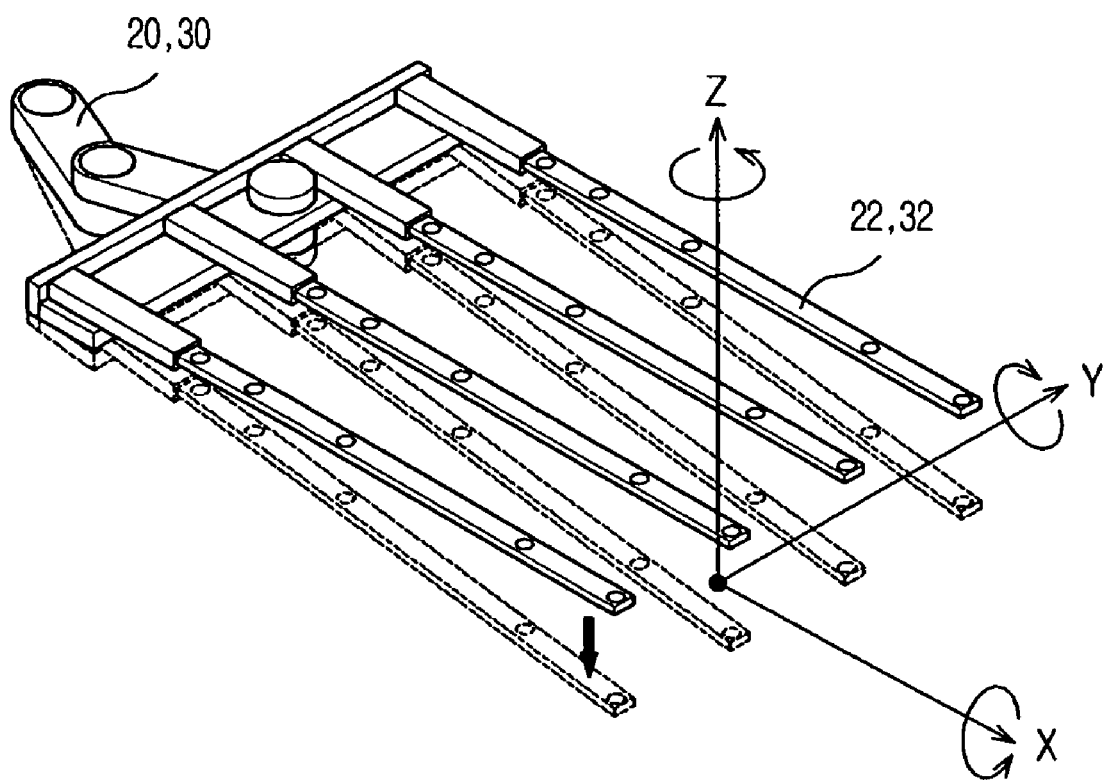
FIG. 4 is a perspective view illustrating a static deflection of an end effector due to a load on the end effector of the handling robot of FIG. 2.

FIG. 4 is a perspective view illustrating the static deflection of the end effector 22 or 32 due to a load on the end effector 22 or 32 of the handling robot of FIG. 2. As shown in FIG. 4, the end effector 22 or 32 extended from the robot arm 20 or 30 exhibits extreme static deflection due to the load on the end effector 22 or 32 or due to a weight of the end effector 22 or 32. This static deflection is not a simple one-degree-of-freedom deflection, and instead a deflection angle of the end effector 22 or 32 varies according to how far the end effector 22 or 32 is extended and according to two-directional ("x" and "y" in FIG. 4) positions of the end effector 22 or 32 due to a mechanical structure of the end effector 22 or 32.

In a case where a flatness of the glass 60 of about several millimeters and a static deflection allowance of about 10 mm are required in a manufacturing process of the glass 60, the handling robot cannot properly handle the glass 60 if it does not minimize the static deflection and the deflection angle using a special apparatus or method.

Figure 5:
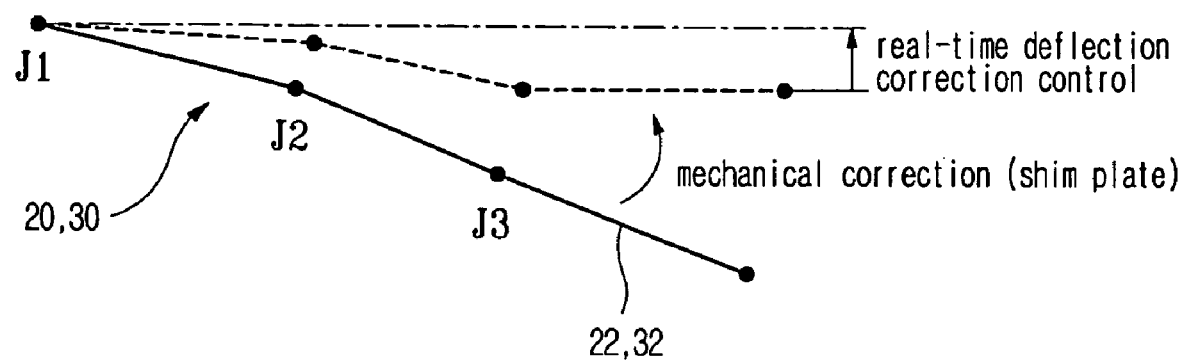
FIG. 5 is a diagram illustrating how the static deflection is corrected through mechanical deflection correction and real-time deflection correction control in the handling robot of FIG. 1.

FIG. 5 is a diagram illustrating how the static deflection is corrected through mechanical deflection correction and real-time deflection correction control in the handling robot of FIG. 2.

As shown in FIG. 5, the present invention minimizes the static deflection of the handling robot shown in FIG. 4 through two-stage (first and second) correction without using a special apparatus or equipment. The first-stage correction is the mechanical deflection correction control in which a shim plate is inserted into joints J1, J2, and/or J3 to minimize the deflection angle of the end effectors 22 and 32. The second-stage correction is the real-time deflection correction control in which a vertical (i.e., z-directional) static deflection is controlled and corrected in real time to minimize the deflection angle of the end effectors 22 and 32.

Figure 6:
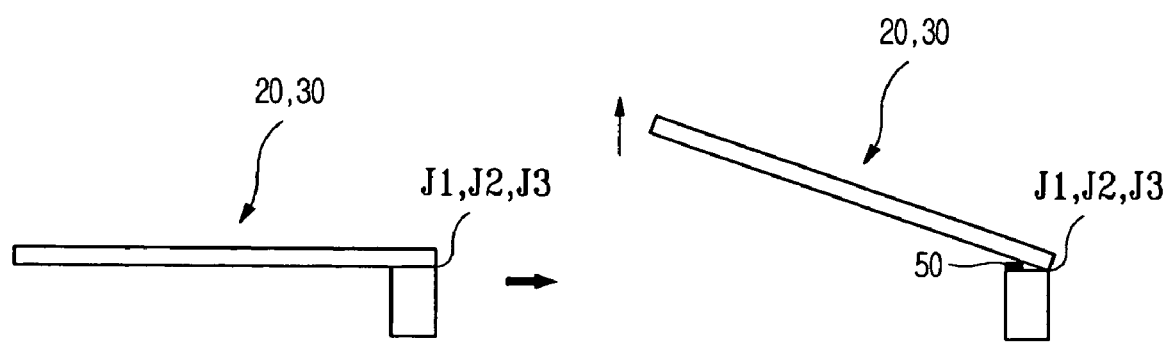
FIG. 6 is a sectional view illustrating the mechanical deflection correction through shim plate insertion in the handling robot of FIG. 2.

FIG. 6 is a view illustrating the mechanical deflection correction control through shim plate insertion in the robot arm 20 or 30.

As shown in FIG. 6, a shim plate 50 is inserted into each of joints J1, J2 and J3 of the robot arms 20 and 30 to minimize x and y-directional deflection angles shown in FIG. 4. The shim plate 50 can be provided at any position corresponding to the joint J1, J2 or J3 between elements of the robot arms 20 and 30 or between the robot arms 20 and 30 and the end effectors 22 and 32. The shim plate 50 can be provided in one or more joints J1, J2 and J3 as needed.

The shim plate 50 can also be provided on each prong of the end effectors 22 and 32 that are in the form of a fork to vacuum-hold the glass 60.

Figure 7:
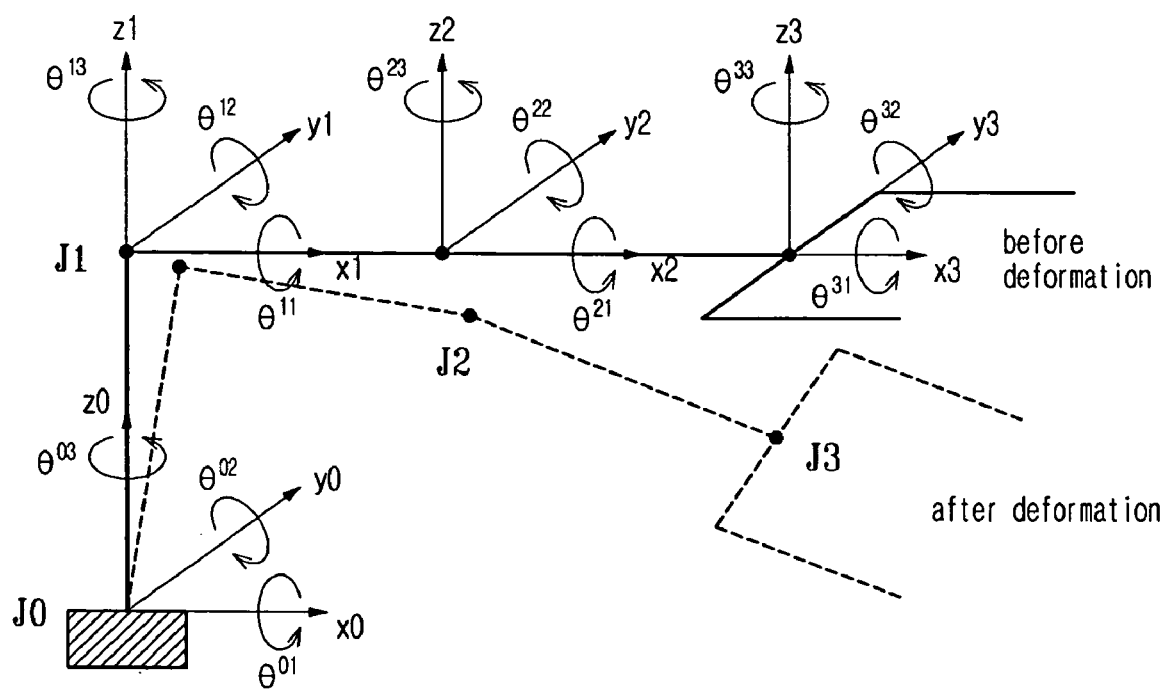
FIG. 7 is a view illustrating an end effector deflection model used for shim plate-based correction in the handling robot of FIGS. 2 and 6.

FIG. 7 is a view illustrating an end effector deflection model used for the shim plate-based correction in the handling robot of FIGS. 2 and 6.

Since it is difficult to experimentally determine an optimal thickness of the shim plate 50 and an optimal insertion position where the shim plate 50 is inserted, the optimal thickness and insertion position of the shim plate 50 may be determined based on the end effector deflection model as shown in FIG. 7.

In an ideal joint model, the end effector 22 or 32 is bent at the joints J1, J2 and J3 only in a rotating direction. However, practically, the end effector 22 or 32 can be twisted in a direction perpendicular to the rotating direction due to insufficient rigidity of the end effectors 22 and 32, and the deflection angle varies according to how far the end effector 22 or 32 is extended. That is, the deflection of the end effectors 22 and 32 has three degrees of freedom corresponding to the x, y and z-directions so that the deflection cannot be calculated through approximation simply based on one degree of freedom.

Figure 8:
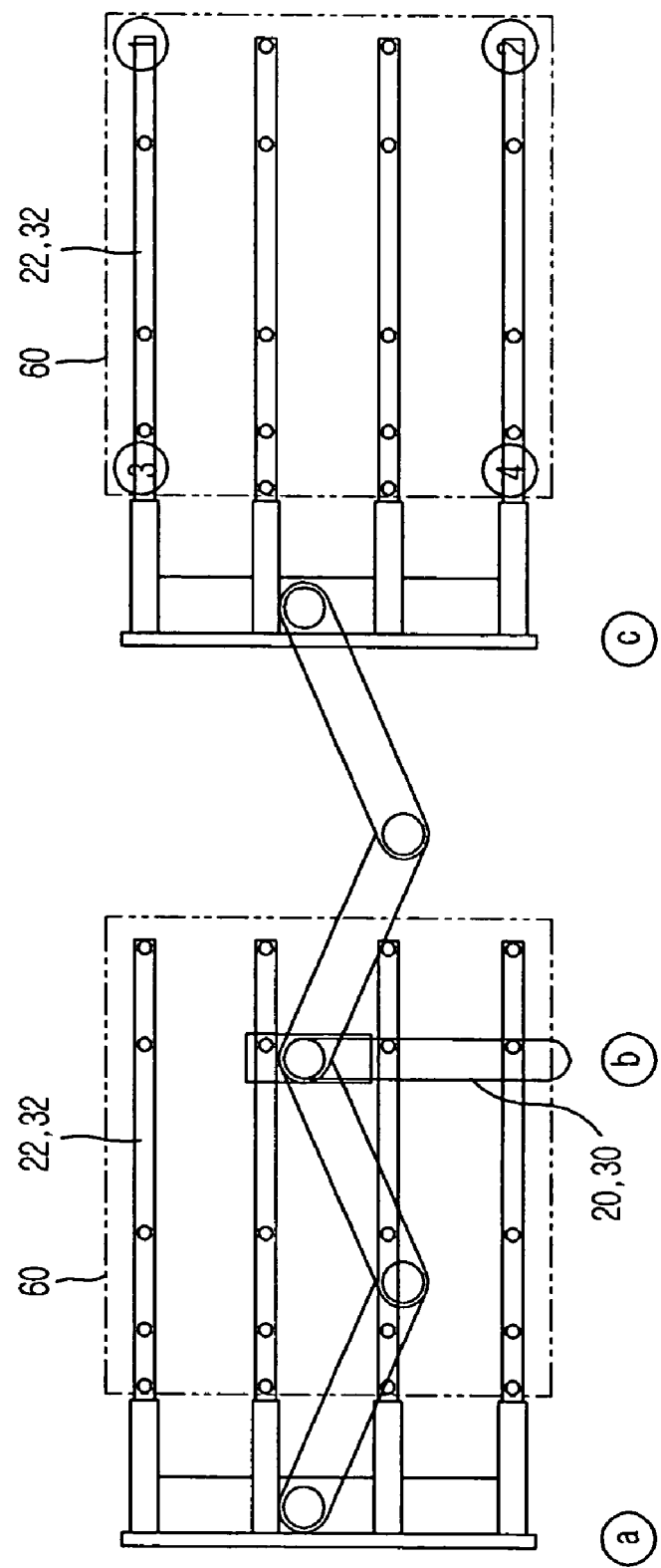
FIG. 8 is a view illustrating positions of the end effector and the robot arm at which deflection angles are calculated for shim plate-based correction in the handling robot of FIG. 2.

Accordingly, each joint J1, J2 or J3 is approximated using an elastic deformation model having multiple degrees of freedom due to a concentrated load of the link, and positions 1, 2, 3, and 4 on the end effectors 22 and 32 for each of the three positions a, b, and c of the robot arms 20 and 30 as shown in FIG. 8 are calculated by Equation 1 to determine a thickness and an insertion position of the shim plate 50 which minimize the deflection angle.

$$P_{hi} = f(\theta_z, \theta_d, \theta_l) \quad \text{[Equation 1]}$$

where $\theta_z = [\theta_z^1\ \theta_z^2\ \theta_z^3]$ (joint angle)

$\theta_d = [\theta_d^{02}\ \theta_d^{03}\ \theta_d^{12}\ \theta_d^{13}\ \theta_d^{22}\ \theta_d^{23}\ \theta_d^{32}\ \theta_d^{34}]$ (static deflection)

$\theta_l = [\theta_l^1\ \theta_l^2\ \theta_l^3]$ (shim)

In Equation 1, "$P_{hi}$ (i=1~4)" calculated for minimizing the deflection angle denotes the positions 1, 2, 3, and 4 on the end effectors 22 and 32. Individual optimization techniques may be necessary for optimal value calculations. However, practical applications may be used for the optimal value calculations since optimization only has to be done once per model if assembly and machining errors of produced handling robots are negligible.

Even if the x and y-directional deflection angles have been minimized through the mechanical compensation using the shim plate 50, a vertical (i.e., z-directional) static deflection still exists as shown in FIG. 5.

To compensate for the vertical static deflection, the controller 40 controls the vertical shaft to force the end effector 22 or 32 to move by a distance corresponding to the vertical static deflection from a current vertical position (i.e., z position) of the end effector 22 or 32, thereby minimizing static deflection based on the front end of the end effector 22 or 32.

Figure 9A:
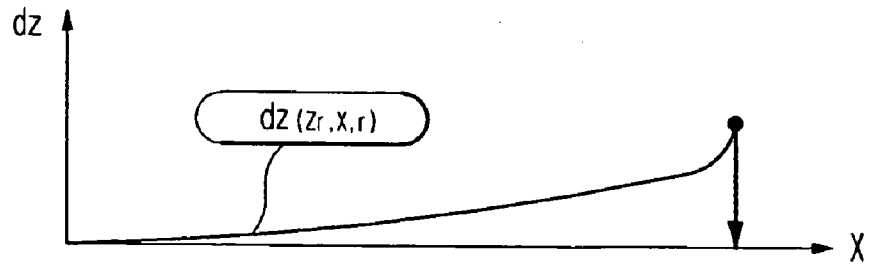
FIGS. 9A to 9C are diagrams showing deflection compensation curves for real-time correction control according to an end effector longitudinal position (x), a rotational position (θ), and a vertical position (z) in the handling robot of FIG. 2, respectively.
Figure 9B:
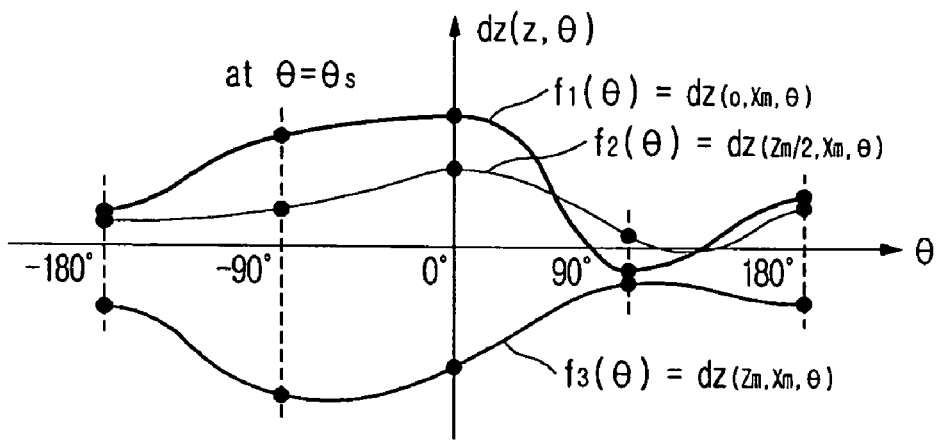
Figure 9C:
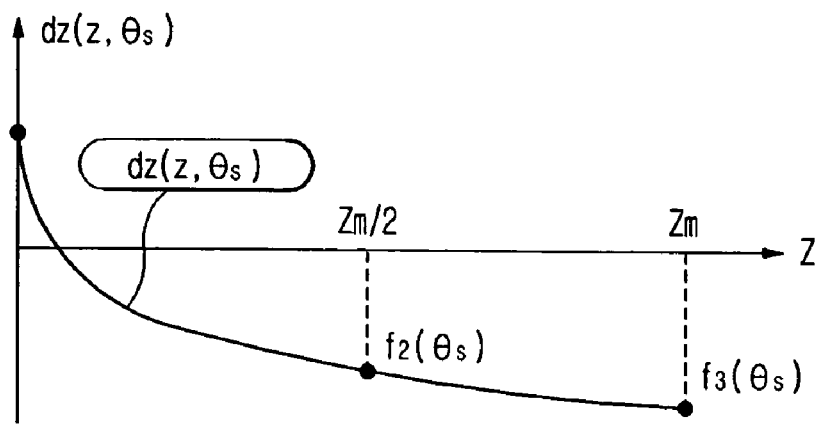

Since this vertical deflection compensation must be performed for any position of the end effectors 22 and 32 within an arbitrary time, the vertical deflection compensation must be performed in real time in an interpolation procedure of the controller 40. For the real-time static deflection compensation control, it is very important to define a proper compensation equation. A compensation equation can be used for real-time control only if it meets the following three requirements, which are illustrated in deflection compensation curves of FIGS. 9A to 9C.

First, the compensation equation may be defined with a function that varies depending on all of the vertical position (z), the end effector longitudinal position (x), and the rotational position ($\theta$).

Second, the compensation equation may be defined with a function that is differentiable for all of the three positional variables so that no discontinuous point occurs in a joint speed even when a user interrupt, such as pause or speed change override, occurs.

Third, a coordinate system of the end effector 22 or 32 from a viewpoint of the user may be invariant even during real-time correction. In other words, even when the vertical (z-directional) shaft moves up for real-time correction while the end effector 22 or 32 is extended, the vertical position of the coordinate system from the viewpoint of the user must be constant. With this feature, real-time correction can be effective, and the robot user can easily control the robot or easily perform a robot motion programming without noticing the presence of the real-time static deflection correction function.

According to an embodiment of the present general inventive concept, the compensation equation, which is defined as Equation 2, has a function, which is differentiable for the three variables (x, $\theta$, and z) and has a 2nd-order polynomial of the end effector longitudinal position (x), a 6th-order polynomial of the rotational position ($\theta$), and a 2nd-order polynomial of the vertical position (z) to meet the three compensation requirements.

$$dz(z, x, \theta) = \left(\frac{x}{x_m}\right)^2 (p(\theta)z^2 + q(\theta)z + r(\theta)) \quad \text{[Equation 2]}$$

where $p(\theta)=(2f_1(\theta)-4f_2(\theta)+2f_3(\theta))/z_m^2$ $q(\theta)=(-3f_1(\theta)+4f_2(\theta)-f_3(\theta))/z_m$ $r(\theta)=f_1(\theta)$ $f_i(\theta)=a_{1i}\theta^6+a_{2i}\theta^5+a_{3i}\theta^4+a_{4i}\theta^3+a_{5i}\theta^2+a_{6i}\theta+a_{7i}(i=1,2,3,4)$ $a_{1i}=4(-7\delta_{i1}+8\delta_{i2}-9\delta_{i3}+8\delta_{i4})/9\pi^6$ $a_{2i}=16(\delta_{i3}-\delta_{i1})/9\pi^5$ $a_{3i}=(47\delta_{i4}-64\delta_{i3}+81\delta_{i2}-64\delta_{i1})/9\pi^4$ $a_{4i}=32(\delta_{i1}-\delta_{i3})/9\pi^3$ $a_{5i}=2(-5\delta_{i4}+16\delta_{i3}-27\delta_{i2}+16\delta_{i1})/9\pi^2$ $a_{6i}=16(\delta_{i3}-\delta_{i1})/9\pi$ $a_{7i}=\delta_{i2}$ In Equation 2, "$z_m$" denotes a maximum vertical stroke of the handling robot, "$x_m$" denotes a maximum stroke of the end effectors 22 and 32, and "$\delta_{ij}$" (i=1~3 and j=1~4) denotes vertical static deflection compensation values measured at vertical positions z=0, $Z_{m/s}$ and $z_m$ and rotational positions $\theta$=−90°, 0°, 90° and 180°.

If the static deflection compensation value $\delta_{ij}$ is set to be sufficiently lower than $z_m$ and $x_m$ in Equation 2, a pure-mechanical equation, obtained taking into consideration the static deflection compensation, is as follows.

$$z' = z_r + dz(z_r, x, \theta) \quad \text{[Equation 3]}$$
$$= z_r + \left(\frac{x}{x_m}\right)^2(p(\theta)z_r^2 + q(\theta)z_r + r(\theta))$$

In Equation 3, z', which is different from a pre-compensation vertical position $z_r$ intended by the user, denotes an actual vertical position to which the vertical shaft motor is moved through the static deflection compensation.

Since Equation 3 provides a unique solution for any position and any time, Equation 3 meets the third compensation requirement that the vertical position from the viewpoint of the user must be constant even during the real-time correction.

The static deflection correction method according to an embodiment of the present general inventive concept, which minimizes static deflection errors through both the mechanical correction by the insertion of the shim plate 50 and the real-time vertical static deflection compensation control, was applied to a robot to handle large sheets of glass in an experiment, and the experiment's results were observed.

In this experiment of the present general inventive concept, the optimal thickness and insertion position of the shim plate 50 were first calculated for the mechanical deflection compensation of the robot arms 20 and 30 or the end effectors 22 and 32 of the handling robot as shown in FIG. 2, and the shim plate 50 was inserted in each joint J1, J2, and J3. Then, static deflections were measured at 9 spatial points for real-time deflection compensation to define a compensation equation, and then vertical path accuracies before and after the compensation were measured while reciprocating the end effectors 22 and 32 at the highest speed.

Figure 10A:
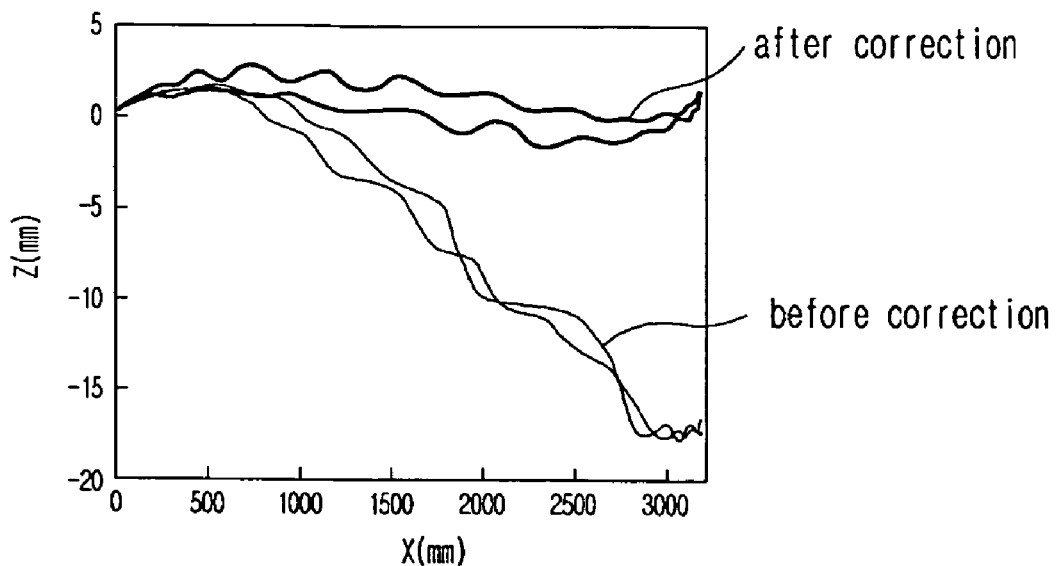
FIGS. 10A and 10B are graphs illustrating experimental results according to vertical movement paths of the end effector before and after static deflection compensation in the handling robot of FIG. 2.
Figure 10B:
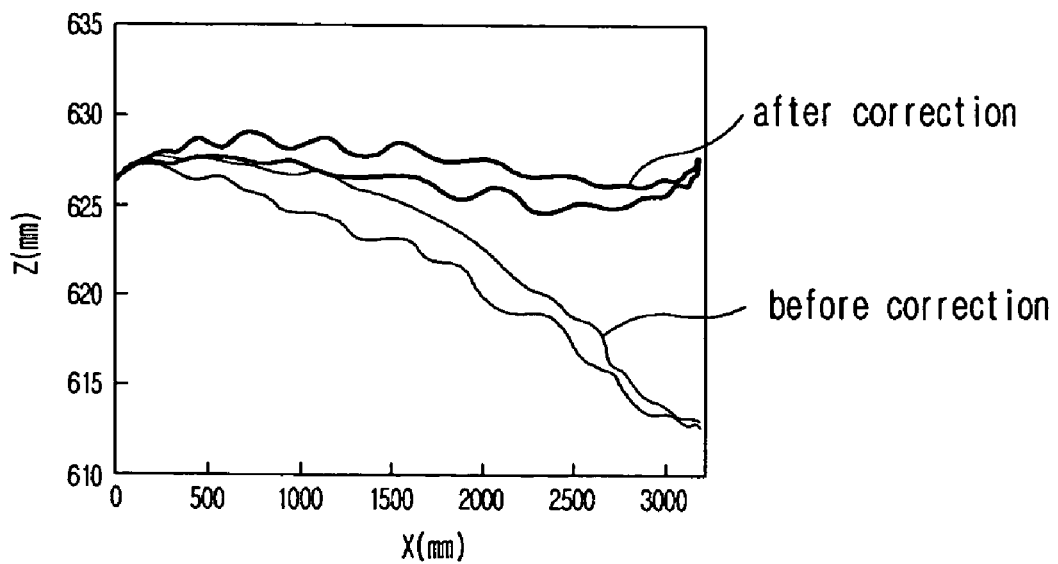

FIGS. 10A and 10B are graphs showing the comparison results of two experiments performed for two positions (z, $\theta$)=(0 mm, 0°) and (626 mm, 90°) where the movement distance of the end effectors 22 and 32 was set to 3500 mm and the highest speed was set to 3200 mm/sec.

In the experiment of FIG. 10A, a maximum vertical path accuracy error, which corresponds to the vertical position of the deflected end effectors 22 and 32, was measured at −19.008 mm before the static deflection correction and at −4.577 mm (nearer to 0 mm) thereafter. In the experiment of FIG. 10B, the maximum vertical path accuracy error was measured at 612.63 mm before the static deflection correction and at 623.12 mm (nearer to 626 mm) thereafter. These experiments indicate that the static deflection correction method according to the present general inventive concept reduces the path accuracy error (i.e., the static deflection) by about 65% on average, regardless of the position of the end effector 22 or 32.

As is apparent from the above description, a method and apparatus to correct a static deflection in a handling robot according to the embodiments of the present general inventive concept performs a simple mechanical correction to minimize the static deflection of an end effector coupled to a robot arm in such a manner that a shim plate is inserted in each joint between elements of the robot arm and the end effector so that the elements of the robot arm and the end effector are directed upward with respect to the horizontal plane, and also performs real-time compensation control of vertical static deflection of the end effector to optimally correct the static deflection of the handling robot without an external measurement apparatus including a laser or the like and a tilting mechanism.

Although a few embodiments of a method and apparatus to correct a static deflections in a handling robot according to the present invention have been shown and described, it would be appreciated by those skilled in the art that changes may be made in these embodiments without departing from the principles and spirit of the present general inventive concept, the scope of which is defined in the claims and their equivalents.

What is claimed is:

1. A method of correcting a static deflection in a handling robot having a robot arm to handle an article, the method comprising:
    correcting a deflection angle of an end effector coupled to the robot arm by inserting a compensation member into a joint of the robot arm,
    wherein the static deflection is caused by a weight the end effector when conveying the article, and the correcting of the static deflection comprises correcting the static deflection in real time,
    wherein the correcting of the real-time static deflection comprises correcting a vertical static deflection using deflection compensation curves according to a vertical position (z), a longitudinal position (x), and a rotational position (θ) of the end effector.

2. The method according to claim 1, wherein the inserting of the compensation member comprises causing each element of the robot arm and the end effector distal to the joint to be directed upward with respect to a horizontal plane to correct x and y-directional deflection angles.

3. The method according to claim 2, wherein the correcting of the deflection angle comprises calculating positions of the end effector with respect to a plurality of positions of the robot arm using an end effector deflection model for a shim plate-based correction and using the following equation:

$$P_{hi} = f(\theta_z, \theta_d, \theta_l)$$

where
    $\theta_z = [\theta_z^1 \; \theta_z^2 \; \theta_z^3]$ (joint angle)
    $\theta_d = [\theta_d^{02} \; \theta_d^{03} \; \theta_d^{12} \; \theta_d^{13} \; \theta_d^{22} \; \theta_d^{23} \; \theta_d^{32} \; \theta_d^{33}]$ (static deflection)
    $\theta_l = [\theta_l^1 \; \theta_l^2 \; \theta_l^3]$ (shim)
    where "$P_{hi}$ (i=1~3)" denotes the positions of the end effector.

4. The method according to claim 3, wherein the compensation member comprises a shim plate, and a thickness and an insertion position of the shim plate, which minimize a calculation value of the equation of $P_{hi}$, is determined to correct the deflection angle of the end effector.

5. The method according to claim 1, wherein the correcting of the real-time static deflection comprises correcting a vertical static deflection using a function differentiable for a vertical position (z), a longitudinal position (x), and a rotational position (θ) of the end effector, the function being expressed as follows:

$$dz(z, x, \theta) = \left(\frac{x}{x_m}\right)^2 (p(\theta)z^2 + q(\theta)z + r(\theta))$$

where $p(\theta) = (2f_1(\theta) - 4f_2(\theta) + 2f_3(\theta))/z_m^2$ $q(\theta) = (-3f_1(\theta) + 4f_2(\theta) - f_3(\theta))/z_m$ $r(\theta) = f_1(\theta)$ $f_i(\theta) = a_{1i}\theta^6 + a_{2i}\theta^5 + a_{3i}\theta^4 + a_{4i}\theta^3 + a_{5i}\theta^2 + a_{6i}\theta + a_{7i} (i=1,2,3,4)$ $a_{1i} = 4(-7\delta_{i1} + 8\delta_{i2} - 9\delta_{i3} + 8\delta_{i4})/9\pi^6$ $a_{2i} = 16(\delta_{i3} - \delta_{i1})/9\pi^5$ $a_{3i} = (47\delta_{i4} - 64\delta_{i3} + 81\delta_{i2} - 64\delta_{i1})/9\pi^4$ $a_{4i} = 32(\delta_{i1} - \delta_{i3})/9\pi^3$ $a_{5i} = 2(-5\delta_{i4} + 16\delta_{i3} - 27\delta_{i2} + 16\delta_{i1})/9\pi^2$ $a_{6i} = 16(\delta_{i3} - \delta_{i1})/9\pi$ $a_{7i} = \delta_{i2}$.

6. The method according to claim 1, wherein the article comprises one or more sheets of glass.

7. An apparatus to correct a static deflection in a handling robot, the apparatus comprising:
    a robot arm to handle an article;
    an end effector coupled to the robot arm to hold the article; and
    a compensation member inserted in a joint of the robot arm to correct a deflection angle of the end effector,
    wherein the static deflection is caused by a weight of the end effector when conveying the article and the correcting of the static deflection comprises correcting the static deflection in real time,
    wherein the correcting of the real-time static deflection comprises correcting a vertical static deflection using deflection compensation curves according to a vertical position (z), a longitudinal position (x), and a rotational position (θ) of the end effector.

8. The apparatus according to claim 7, wherein the robot arm comprises a plurality of elements, and the compensation member comprises a shim plate inserted in the joint between the elements of the robot arm.

9. The apparatus according to claim 7, wherein the compensation member comprises a shim plate inserted in the joint between the robot arm and the end effector.

10. A method of correcting a static deflection in a handling robot, the method comprising:
    correcting, in real time, a static deflection caused by a weight of the handling robot when conveying an article;
    wherein the correcting of the real-time static deflection comprises correcting a vertical static deflection using deflection compensation curves according to three variables corresponding respectively to a vertical position (z), a longitudinal position (x), and a rotational position (θ) of an end effector, or using a function differentiable for the three variables.

11. A method of correcting a static deflection in a handling robot, the method comprising:

correcting a static deflection of an end effector of a robot arm of the handling robot using a mechanical compensation and a real time compensation, wherein the static deflection is caused by a weight of the end effector when conveying the article, and the correcting of the static deflection comprises correcting the static deflection in real time, wherein the correcting of the real-time static deflection comprises correcting a vertical static deflection using deflection compensation curves according to a vertical position (z), a longitudinal position (x), and a rotational position ($\theta$) of the end effector.

12. The method according to claim 11, wherein the correcting of the static deflection using the real time compensation comprises correcting, in real time, the static deflection caused by a weight of the robot arm or the end effector.

13. The method according to claim 11, wherein the correcting of the static deflection using the mechanical compensation comprises correcting the static deflection using a compensation member in first and second directions, and the correcting of the static deflection using the real time compensation comprises correcting, in real time, the static deflection caused by a weight of the robot arm or the end effector in a third direction.

14. An apparatus to correct a static deflection in a handling robot, the apparatus comprising:
a robot arm to handle an article;
an end effector coupled to the robot arm to hold the article; and
a controller to correct, in real time, a static deflection caused by a weight of the end effector when conveying the article;
wherein the controller performs the real-time static deflection correction to correct a vertical static deflection using deflection compensation curves according to three variables corresponding respectively to a vertical position (z), a longitudinal position (x), and a rotational position ($\theta$), or using a function differentiable for the three variables.

15. An apparatus to correct a static deflection in a handling robot, the apparatus comprising:
a robot arm to handle an article;
an end effector coupled to the robot arm to hold the article; and
a compensation unit to correct a static deflection of an end effector of the robot arm of the handling robot using a mechanical compensation and a real time compensation,
wherein the static deflection is caused by a weight of the end effector when conveying the article, and the correcting of the static deflection comprises correcting the static deflection in real time,
wherein the correcting of the real-time static deflection comprises correcting a vertical static deflection using deflection compensation curves according to a vertical position (z), a longitudinal position (x), and a rotational position ($\theta$) of the end effector.

* * * * *